United States Patent Office 3,354,287
Patented Nov. 21, 1967

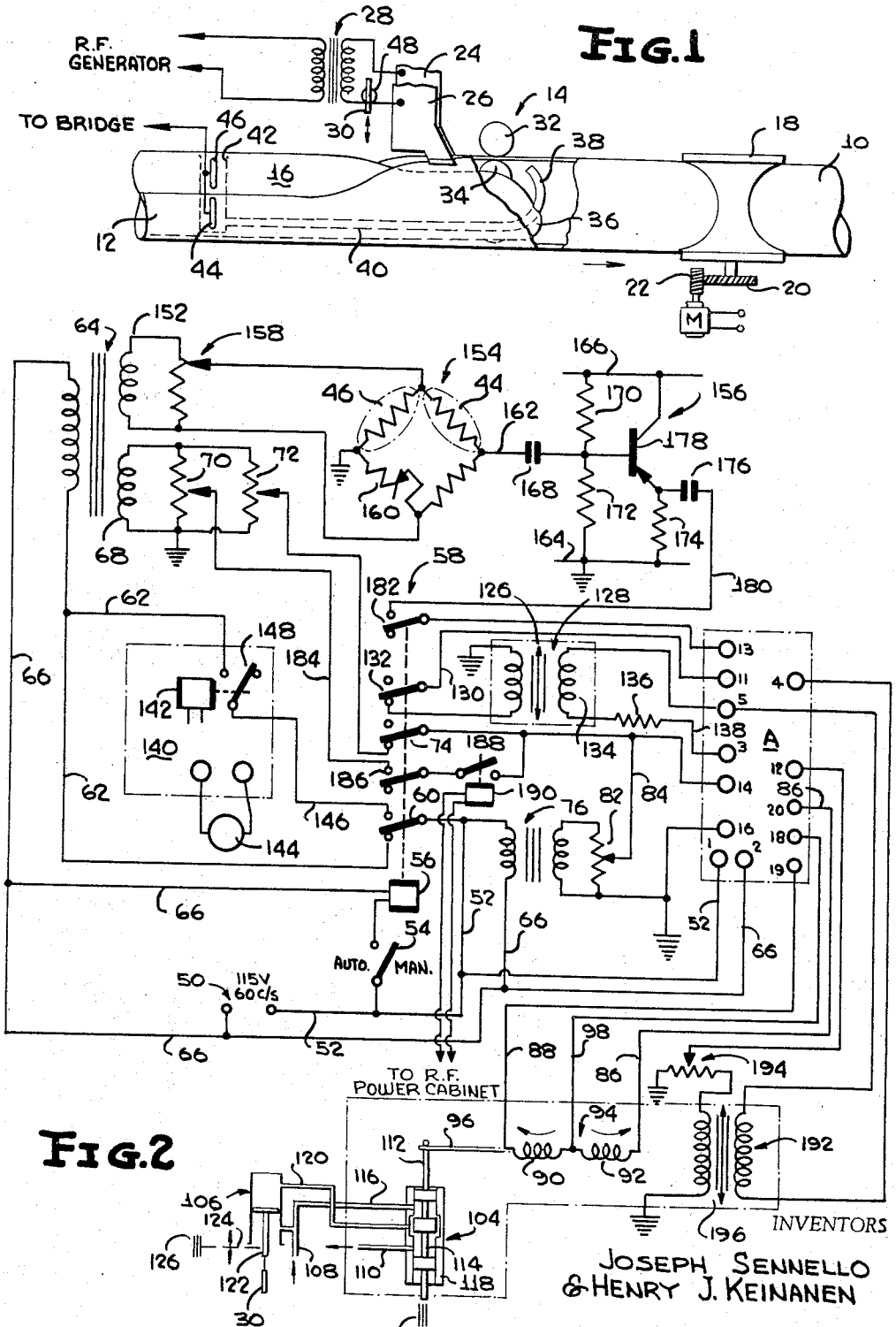

3,354,287
WELDING CONTROL CIRCUIT
Joseph J. Sennello and Henry J. Keinanen, Oak Lawn, Ill., assignors to Continental Can Company, Inc., New York, N.Y., a corporation of New York
Filed Oct. 18, 1963, Ser. No. 317,175
21 Claims. (Cl. 219—110)

ABSTRACT OF THE DISCLOSURE

A metal welding circuit is disclosed which has both an automatic and a manual mode of operation. The power to the welding shoes of the welding line is controlled via a transducer. During the manual mode of operation, a manually selected signal is compared to a signal representative of the position of the power controlling transducer and the power controlling transducer is driven to a position wherein the two signals are the same. During automatic operation, the heat from the weld joint is transmitted to a photoconductor cell which is then used, in turn, to provide a signal representative of such heat. This heat representative signal is compared to a manually selected signal and the power control transducer is driven to a position wherein the two signals are the same. Further, a welding horn having a photoconductor device therein and having a glass tube for transmitting visible and infra-red heat radiation to the photoconductor device is disclosed.

---

This invention relates to a novel welding apparatus control circuit for electrically controlling the welding energy input per unit length of welding material. More specifically, the invention relates to a control circuit which has both a manual mode of operation and an automatic mode of operation.

In manual operation the control circuit may be adjusted by means of a manually adjustable potentiometer for controlling the welding energy input with respect to this manually adjustable signal. This signal is then calibratable with respect to various welding temperatures. In automatic operation the circuit contains an automatic mode potentiometer which is used to create a reference signal. A welding temperature variable signal is compared with respect to this reference signal to effect control of the welding energy input per unit length of metal.

In the welding of metal seams at relatively high speed by heating the metal to a forge welding temperature and forging the edges of metal together various critical variables are present. The primary critical variable appears to be the contact temperature range over which a particular metal will forge weld. If the energy input per unit length of the welding metal is not within a very narrow range, then the critical temperature for that particular metal will not be attained as the metal edges move relative to the welding apparatus. When using an electrical resistance welder, the power input to the welding shoes must be controlled as the metal moves with respect to the welding shoes. This movement also sets up the feed of movement as a variable related to the critical temperature range. The thickness of the overlapping edges of metal and the pressure exerted by the forge rolls are critical variables for controlling the critical temperature range.

It has been found that the various metals and metal alloys used in fabricating metal containers and in particular food containers each have their specific critical temperature ranges outside of which the metals will not properly forge weld.

In order to attain commercial production rates for the welding of such container body stock, it is essential that an accurate control of the welding energy input per unit length of metal with respect to the critical temperature range of welding be provided over the various linear welding speeds used.

It is an object of this invention to provide a metal welding control circuit for electrically controlling the welding energy input per unit length of metal from a heating source with respect to the critical temperature range over which the metal may be forge welded.

It is another object of this invention to provide a circuit for controlling the welding energy input per unit length of metal by the use of a circuit containing a series summation signal amplifier or signal mixing and amplifying means which is powered by a current source independent of the welding energy heating source and wherein the output of the amplifier controls a torque motor or transducer with electrical input and mechanical output which, in turn, controls the heating source, and wherein said summation signal amplifier amplifies a summation signal input consisting of a torque motor position signal and a manually variable metal temperature reference signal which are compared in an amplifier mixing stage to produce a deviation signal which drives the torque motor to a position of less deviation.

A further object of this invention is to provide a circuit in which the torque motor position signal of the above object is directly proportional to the movement of the torque motor during manual operation and is dependent upon the temperature of the welding metal during automatic operation.

Another object of this invention is to provide a metal welding control circuit wherein the heating source control which controls the welding energy input per unit length of metal is automatically controlled by an amplified deviation signal generated by comparing a signal which is proportional to positions of a torque motor with a manually variable temperature reference signal, wherein the torque motor signal controls said heating source control.

A further object is to provide a metal welding control circuit satisfying the above object wherein the torque motor position signal is generated by a torque motor position signalling and control means consisting of a heating source control transducer and a metal temperature sensing and signalling means.

Another object is to provide a metal control circuit wherein the metal temperature sensing and signalling means is a temperature variable grounded output Wheatstone bridge which is connected to the signal comparing amplifier through a transistor operated emitter follower and wherein the Wheatstone bridge is controlled by the temperature of the welding metal. This object is preferably attained by the use of a glass rod for transmitting the metal temperature heat to the Wheatstone bridge.

Yet another object is to provide a metal welding control circuit wherein a single switching means is controllable between a manual position and an automatic position for changing the operation of the circuit from manual to automatic and thereby changing the control of the heating source of the welding energy from a manually controllable reference signal to a metal welding temperature dependent reference signal.

Yet another object of this invention is to combine with the control circuit a quiescent current input signal generating means which is operable in either manual or automatic modes for driving the heat source control to a minimum energy input position. Through providing such a bias voltage generating means, minimum power is present when the welding apparatus is being started up or when it is operating at very low welding speeds.

Yet another object is to provide an automatic metal welding control circuit which reduces the hunting of the automatic circuit by providing a damping transducer for limiting the circuit frequency of response.

Another object of the invention is to provide a metal welding control circuit which has an automatic mode of operation for controlling the welding energy input with respect to the temperature of the welding metal wherein the automatic operation does not begin until a minimum speed of the welding apparatus with respect to the welding metal is maintained.

Yet another object is to provide a metal sheet tubular forming and welding horn which has a glass rod and a temperature sensistive photoconductors therein, wherein said glass rod is positioned to transmit heat radiation from the metal welding side to the photoconductor and wherein the photoconductor is part of a welding energy source control circuit.

These and other objects will become obvious from the following drawing and description thereof which is intended to be illustrative and not limitative.

FIGURE 1 is a schematic diagram of a continuously operating metal tube welder showing the driving motor, the welding shoes, and the temperature detecting devices of the welding circuit control; and FIGURE 2 shows schematically the welding control circuit of the invention.

Referring to FIGURE 1, a tube 10 is shown being formed from a metal strip or skelp 12 by a schematically represented metal tube welding apparatus 14. This welding apparatus consists of a horn 16 about which the strip 12 is formed by conventional forming apparatus (not shown) and over which the strip is drawn by drive means such as drive rollers 18 which are powered through suitable drive means such as a pinion gear 20 and a worm gear 22 driven by motor M.

As the metal strip 12 is brought into tubular shape around the horn 16, the edge portions thereof are contacted by welding shoes 24 and 26. Welding energy is supplied to these welding shoes through a reactance controlled power transformer 28. The secondary of transformer 28 is connected between the two shoes 24 and 26 and the primary coil is connected to a suitable source of R.F. power such as a 50 kva. generator which operates at 450 kc. The reactance of the secondary coil is controlled by movement of a ferro-magnetic core or control core 30 which is movement controlled by a hydraulic cylinder which is in turn positioned by the welding control circuit of the present invention. The control core 30 is a heating source control transducer.

After the edge portions of the strip 12 are contacted by the welding shoes 24 and 26, these edge portions are heated to the critical temperature range at which the particular metal strip will weld. The edge portions are then brought into engagement and pressed or forged together by forge rolls 32 and 34. It is manifest that this welding apparatus may be used in either a butt welding operation or various types of lap welding operations depending upon the nature of the seam desired.

The horn 16 has an end portion 36 which can be seen through the cut-away portion of the welded tube 10. A glass rod 38 is shown extending from horn end portion 36. This tube transmits visible and infra-red spectrum heat radiation from the welded metal just after the point where the metal has been forged together by opposing forge rolls 32 and 34, back through the horn, as shown by dotted lines 40, to a resistance well 42. Within the resistance well is a temperature sensitive photosensitive semiconductor or resistance element 44 and an ambient temperature sensitive photosensitive semiconductor or resistance element 46 which comprise two of the resistances of a Wheatstone bridge circuit which is part of the welding control circuit of the present invention which in turn controls the reciprocation of ferro-magnetic core 30 within the single loop reactance coil 48 which is connected in series with the secondary coil of transformer 28.

Although the ferro-magnetic core 30 is shown in series with the secondary coil of the shoe transformer 28, it is also within the scope of this invention to control the reactance in the generator circuit supplying energy to the motor M for effecting a control of the rate of movement of the tube 10 past the welding shoes to thereby control the energy input per unit length of metal. That is, either the R.F. welding current or the speed of the tube moving through the welding apparatus may be controlled, both of which control the critical temperature range outside of which the particular metal will not weld.

Referring now to FIGURE 2, a schematic diagram of the electrical circuitry of the welding control circuit is shown operating from a 115 volt 60 c.p.s. power source 50. The input power supply 50 is conducted by line 52 to switch 54 which has a manual and an automatic position. When switch 54 is in manual position, relay 56 is de-energized and the switching means 58 has all switch blades or contacts in the de-energized position as shown. Current is then transmitted through lowest switch blade 60 through line 62 to power supply transformer 64. A power source return line 66 is connected to the other primary coil lead. The secondary of transformer 64 has a split coil secondary and the first secondary coil 68 is connected to a first potentiometer 70 which allows for manual adjustment. This potentiometer supplies a metal temperature reference signal when the circuit is in automatic mode. A second potentiometer 72 is connected in parallel to potentiometer 70 and to ground. The metal temperature reference signal generated by potentiometer 72 is then sent through switch blade 74 to amplifier A.

Amplifier A should be preferably a low voltage transistor servo amplifier which is capable of accepting a plurality of low power AC signal inputs comparing them and amplifying the resultant signal to a higher voltage and power level. This amplifier is referred to here as a series summation signal amplifier. A commercial type of such amplifier is the XRJ 301-type amplifier referred to as the XRJ 301–B and XRJ-301–A2 transistor amplifiers sold by the Minneapolis-Honeywell Regulator Company. The output of this amplifier is particularly adaptable to powering a split-field torque motor or servo motor.

An external bias control means feeds a bias control signal to the amplifier A. This bias current holds the control core 30 in loop 48, or returns it to a position of minimum R.F. power position until the metal temperature reference signal is present at the amplifier input. This external bias control means is a transformer 76 which is continuously powered through lines 52 and 66. The secondary output therefrom is variable by adjustment of potentiometer 82 and is added to the metal temperature reference signal to amplifier A through line 84, the resistance of the potentiometer 82 being connected to ground terminal 16 of amplifier A. The metal temperature reference signal and the bias control signal additively represent a standard reference input signal to the amplifier A at terminal 14.

An internal bias control in amplifier A is adjustable between zero and 50 percent of maximum output current of the amplifier A and is preadjusted to produce a quiescent current of 60 ma. in a balanced 70 ohm load in the amplifier output circuit. The amplified output current is sent by lines 86 or 88 to the split-field coils 90 and 92 of torque motor 94 which has in addition to the coils a centered pivot armature 96. The return from the coils is through line 98 to the amplifier A and through line 66 connecting amplifier A to power source 50. The power input to amplifier A is through line 52. The movement of torque motor armature 96 is controlled by the difference in current between coils 90 and 92. When the current in coil 92 is greater than in coil 90, the armature 96 moves in opposite rotation to that which results from the current in coil 90 being greater than in coil 92.

The movement of armature 96 controls the operation of servo valve 104 which has a hydraulic cylinder 106 controlled thereby. A source of hydraulic fluid 108 with a return hydraulic fluid line 110 is provided for the cylinder. As the armature 96 moves, linear motion is imparted to spool push rod 112 and then to spool 114 so that pressurized fluid passage from input line 116 to the valve body 118 may be controlled by reason of controlling the cylinder fluid input line 120.

A linear transducer core 126 is attached to hydraulic cylinder rod 122 by a mechanical linkage 124. This core 126 controls the secondary of linear transducer or position LVDT 128. The primary of linear transducer 128 receives AC power from amplifier A terminals 3 and 5. The secondary of the position LVDT is connected to amplifier A at terminal 11. The resistor 136 in line 138 is used to reduce input voltage to terminal 11. A suitable position LVDT (linear variable differential transformer) may be obtained from Minneapolis-Honeywell Regulator Company as M-H type XTJ 306.

As the control core 30 moves, the transducer core 126 is positioned in linear transducer 128, and a low voltage AC signal is supplied as an input signal to amplifier A at terminal 11 which is directly proportional to the position of the control core 30. This low voltage AC input signal is then a torque motor position signal also. The linear transducer 128 position signal is compared in the mixing stage against the total reference signal of the metal temperature reference signal from potentiometer 72 and the bias control signal from potentiometer 82. Amplifier A combines by series summation these two signals and if they do not cancel out an error-signal is produced. This error or deviation signal after amplification in the amplifying stage will cause current flow through either of coils 90 or 92. The phasing of this deviation signal determines which of the two coils will be activated. Generally, an input signal of the same phase as the supply voltage in line 52 will cause an increase in current output in coil 90 and a decrease in current output in coil 92. Phase discrimination of the output signal can be obtained from the differential voltage across a balanced load such as the split-field coil torque motor 94.

When the welding apparatus 14 shown in FIGURE 1 is set into motion and a particular potentiometer setting for potentiometer 72 is chosen and switch 54 is set to manual operation, the R.F. power supply to welding shoe 24 and 26 will usually be lower than is operative for continuous welding. This means that ferro-magnetic core 30 must be positioned with respect to coil 48 of FIGURE 1. The deviation signal amplified in amplifier A then drives torque motor 94 to a position where the control core increases the R.F. current supply to the welding shoes and by so doing causes linear transducer 128 to feed an input signal into amplifier A which cancels out the deviation signal with respect to the compared reference input signals from potentiometer 72 and 82. When the deviation signal is zero, the current input from transducer 128 is balanced by the input signal from potentiometer 72 and the bias control potentiometer 82.

In automatic operation switch 54 is turned to automatic position and power is supplied from source 50 to activate relay 56 which changes all of the switching contacts in switching means 58 to the automatic position by raising all switch blades to their uppermost contact. Switch 54 and switching means 58 may be referred to collectively as the circuit switching means. Current flows in line 52 from source 50 through switch blade 60 to speed sensitive relay circuit 140 which contains a relay 142 which is powered when switch 54 is in automatic position as soon as the control speed of the tube drawn through the welding apparatus of FIGURE 1 has been reached. This speed is sensed by a tachometer-generator 144 which is shown schematically in FIGURE 2. The speed sensitive relay 142 then closes and power is transmitted from switch blade 60 through line 146 through relay switch 148 into line 62. This circuit then powers input power transformer 64 in the same manner as described above.

The input power transformer 64, in addition to powering secondary coil 68 as above described, powers secondary coil 152 which is used to supply power to the Wheatstone bridge circuit 154 and the transistor emitter follower circuit 156. A manual adjustment to vary the input current to Wheatstone bridge 154 is provided by potentiometer 158. Resistances 44 and 46 of Wheatstone bridge 154 are shown also in resistance well 42 in horn 16 of FIGURE 1. These temperature sensitive resistors set in resistance well 42 are enclosing in a copper plug (not shown) and the primary temperature sensitive resistor 44 is positioned at the end of glass rod 38 for sensing the heat radiation signal which is transmitted thereby. The well 42 is placed in forming horn 16 at a point sufficiently removed from the R.F. field intensity and far enough from the point of welding heat so that errors are not set up in the control circuit by reason of uncontrollable environmental temperatures and magnetic fields.

The variable input to Wheatstone bridge circuit 154 is balanced through potentiometer 160 when the R.F. generator is disconnected and is output grounded as shown. The output impedance, when balanced, is roughly 200K ohms; as the heat signal transmitted by the glass rod 38 is increased the temperature sensitive cell 44 will have the resistance thereof decreased so that during automatic operation the output impedance is about 8K ohms.

Cells 44 and 46 are photosensitive semiconductor cells and as such, their conductivity increases with increases of the heat radiation signal transmitted by glass rod 38. Lead sulfide photoconductive detector cells, such as manufactured by Eastman Kodak Company under the name "The Kodak Ektron Detector," are suitable. The resistance well 42 is open at the top to provide ambient heat radiation for cell 46.

An emitter follower circuit 156 is connected to the output line 162 from Wheatstone bridge circuit 154. This emitter follower circuit operates between lines 164 and 166 which have a 12 volts drop thereacross. Capacitor 168 is rated at approximately 0.047 mf. and resistors 170, 172 and 174 are rated at 220K ohms, 680K ohms, 39K ohms respectively, and capacitor 176 is rated at 1 mf. The bridge circuit 154 and emitter follower circuit 156 function as a temperature sensing and signalling means.

The temperature variable input signal is sent through line 180 and switch blade 182 to terminal 13 of amplifier A and there combined in the mixing stage with the input signal from potentiometer 70 of secondary coil 68 which is transmitted through line 184 and switch blade 186 to terminal 14 of amplifier A when switch 188 is in the upper position. Switch 188 is activated by a relay 190 which is energized at the moment the R.F. power is turned on. (The relay 190 is connected in parallel with the contactor coil operating R.F. "on"-"off" switch.)

The purpose of the switch 188 is to isolate terminal 14 from potentiometer signal 70 at the moment when R.F. power is turned off so that bias 76 can drive the control core 30 to minimum power position. (See FIGURE 2.) As in the above description, transformer 76 generates bias control current which is also added to the manually adjusted temperature reference signal. The total of these two input signals is then compared against the temperature dependent signal transmitted in line 180 in the mixing stage of amplifier A. The deviation signal is then amplified and used to power coils 90 and 92 as set out above.

Switch 132 is in the off position when automatic operation is used and the switching means 58 is in automatic position. This cuts out the linear transducer 128 signal from the input signals to the amplifier A. Ferro-magnetic core 30 movement then is proportional to the position of torque motor armature 96 and may be used to control the temperature of the welding metal between forge rolls 32 and 34. This temperature is then transmitted by glass rod 38 and sensed by resistor 44 to create a temperature variable signal through Wheatstone bridge circuit. This temperature reference signal transmitted in line 180 may be referred to as a torque motor position signal since the temperature of the metal is controlled by the position of the torque motor armature and this temperature then controls the signal in line 180.

The deviation signal in the amplifying stage of the amplifier A will move torque motor armature 96 in both directions about the pivot depending upon the phasing of the input signal resultant signal with respect to the supply voltage; hence there is a natural frequency of "hunting" as the amplified deviation signal goes to zero and then reappears and is amplified and sent through first one torque motor coil and then the other. In order to reduce this natural frequency of "hunting" which is approximately 10 c.p.s., a linear variable differential transformer 192 is powered from terminals 4 and 5 of amplifier A and the secondary output used to damp the temperature dependent input signal from line 180 in the mixing stage of amplifier A. The amplitude of this signal is adjustable through potentiometer 194. The transformer core 196 is controlled by means of servo-valve 104 as shown schematically at the bottom of spool push rod 112.

Throughout the circuit shown in FIGURE 2 ground points have been indicated. It is convenient to use the chassis of the amplifier unit as the ground common to all of these points.

Torque motor 94, servo-valve 104 and differential transformer 192 combination which are used with amplifier A may be referred to as an electro-hydraulic servo-valve consisting of a single stage 3-way servo-valve whose output flow is proportional to input signal. The servo-valve spool is controlled in the valve sleeve by a permanent magnet slip-field torque motor. The torque motor produces an output displacement proportional, in both magnitude and direction, to the input differential signal current. Thus, an electrical signal to the torque motor results in a given spool displacement and a corresponding pressure-flow output from the valve.

A conveniently used and commercially available electro-hydraulic servo-valve may be obtained as the VJ302B-type from the Minneapolis-Honeywell Regulator Company. This servo-valve has a linear variable differential transformer included therein for damping purposes as above mentioned.

Any suitable source of hydraulic fluid 108 is usable with a hydraulic cylinder controlled by such a servo-valve.

Amplifier A is a standard amplifying circuit having a mixing stage and an amplifying stage therein and having a plurality of input signal terminals and three output terminals corresponding to lines 86, 88 and 98 and having power input lines 52 and 66, connected at terminals 20, 19, 18, 1 and 2; respectively.

By use of the above described welding control circuit the welding temperature of a continuously welded tube can be maintained within the critical temperature range necessary to perform an accurate welded seam in the metal tube.

Such a control circuit enables the continuous welding of metal tubing of thicknesses between the ranges of 0.006 and 0.011 inch which is the accepted thicknesses of metal used in forming food containers.

The circuit allows for the automatic and high sensitivity temperature reference signal necessary to effect a continuous and uniform weld seam in such tubes.

Induction heaters, combustion heaters, or other types of rapid heating devices may be used for the heating source of this invention for the R.F. current device illustrated.

It is obvious that the illustrative practices are not restrictive and that the invention can be practiced in many ways within the scope of the appended claimed subject matter.

We claim:

1. A metal welding control circuit for electrically controlling the welding energy input per unit length of metal from a heating source comprising, a signal mixing and amplifying means in said circuit, a power source for said circuit, a transducer having electrical input and mechanical output and being electrically connected to an output of said mixing and amplifying means for control by an output signal from said mixing and amplifying means, a heating source control variable by said transducer for controlling said heating source, means responsive to said mechanical output of said transducer for producing a transducer position signal, manually variable means for providing a compared or reference signal wholly independent of the transducer positions, said means responsive to said mechanical output and said manually variable means being electrically connected to said mixing and amplifying means, said mixing and amplifying means being responsive to said transducer and compared or reference signals fed thereto for providing said output signal which comprises a deviation signal between said transducer position signal and said compared or reference signal, and said transducer being responsive to said output signal to control said transducer position signal to a state of less deviation from said compared or reference signal to approximate said compared or reference signal and to control said heating source to adjust the welding energy input per unit length of metal.

2. A metal welding control circuit as in claim 1 wherein said means responsive to the mechanical output of said transducer for producing a transducer position signal comprises position responsive means for providing a transducer position signal which is directly proportional to the movement of said transducer mechanical output.

3. A metal welding control circuit as in claim 1 wherein said means responsive to the mechanical output of said transducer for producing a transducer position signal comprises sensing means responsive to the temperature of the welding metal for producing a transducer position signal dependent upon the temperature of the welding metal.

4. A metal welding control circuit as in claim 1 wherein said means responsive to the mechanical output of said transducer for producing a transducer position signal comprises means for varying the heating of the welding metal by controlling said heating source control, and heating sensing means for producing a heat indicating signal dependent upon the temperature of the welding metal.

5. A metal welding control circuit for electrically controlling the welding energy input per unit length of metal from a heating source comprising, a series summation signal amplifier in said circuit, a power source for said circuit, a torque motor having split-field coils and an armature controlled by an output signal from said amplifier, a manually variable metal temperature reference signal potentiometer connected to said power source for sending a pre-selected comparison input signal to said amplifier, a torque motor armature position signalling and heating source control means for generating a signal proportional to positions of said torque motor armature and for controlling said heating source, said series summation signal amplifier comparing the comparison input signal from said reference signal potentiometer with the signal proportional to positions of said torque motor armature and driving said torque motor armature with the amplified deviation signal to a position at which said signal proportional to positions of said torque motor armature is of less deviation from the comparison input signal from said reference signal potentiometer.

6. A metal welding control circuit as in claim 5 wherein said torque motor position signalling and heating source control means consists of a heating source control transducer for controlling said heating source to control the energy input per unit length of metal and thereby the temperature of the welding metal, and a metal temperature sensing and signalling means connected to said power source for sending a metal temperature dependent signal to said amplifier.

7. A metal welding control circuit as in claim 6 wherein said metal temperature sensing and signalling means consists of a welding metal temperature variable grounded output Wheatstone bridge powered by said power source and adjustable by a manually adjusted bridge potentiometer, said Wheatstone bridge connected to said amplifier through a transistor operated emitter follower, a first temperature sensitive resistor of said bridge variable with respect to the temperature of the welding metal heated by said heating source, and a second temperature sensitive resistor of said bridge variable with respect to ambient temperature.

8. A metal welding control circuit as in claim 6 wherein said metal temperature sensing and signalling means consists of a welding metal temperature variable grounded output Wheatstone bridge powered by said power source and adjustable by a manually adjusted bridge potentiometer, said Wheatstone bridge connected to said amplifier through a transistor operated emitter follower, a first temperature sensitive resistor of said bridge variable with respect to the temperature of the welding metal heated by said heating source, a second temperature sensitive resistor of said bridge variable with respect to ambient temperature and a glass heat transfer rod for transmitting heat from the close proximity of the metal welding site to said first temperature sensitive resistor.

9. A metal welding control circuit for electrically controlling the welding energy input per unit length of metal from a heating source comprising, a series summation signal amplifier in said circuit, a power source for said circuit, a torque motor having coils and an armature controlled by an amplified output signal from said amplifier, a switching means controlling said power source activation of said circuit and having a manual switch position and an automatic switch position, said power source powering at least two manually variable metal temperature reference signal potentiometers when said switching means is in manual position and when said switching means is in automatic position, the first of said reference signal potentiometers connected to said amplifier through said switching means in manual position and the second of said reference signal potentiometers connected to said amplifier through said switching means in automatic position for sending a comparison input signal to said amplifier, a torque motor position signal transducer and a heating source control transducer for generating signals proportional to positions of said torque motor armature, said torque motor position signal transducer connected to said power source by said switching means in manual position and connected to said amplifier for sending a torque motor position signal input to said amplifier, said heating source control transducer controlling said heating source to control the energy input per unit length of metal and thereby the temperature of the welding metal, a metal temperature sensing and signalling means connected to said power source through said switching means in automatic position for sending a metal temperature dependent signal to said amplifier, said series summation signal amplifier comparing the comparison input signal from said first reference signal potentiometer when said switching means is in manual position with the signal from said torque motor position signal transducer, and driving said torque motor armature with the amplified deviation signal, said series summation signal amplifier comparing the comparison input signal from said second reference signal potentiometer when said switching means is in automatic position with the signal from said metal temperature sensing and signalling means and driving said torque motor armature with the amplified deviation signal, whereby the amplified deviation signal drives said torque motor armature to a position at which said signals proportional to positions of said torque motor armature are of less deviation from said comparison input signal.

10. A metal welding control circuit as in claim 9 wherein a bias control quiscent current signal generating transformer is connected to said amplifier independently of said switching means for supplying a bias voltage to the mixing stage of said amplifier to drive said torque motor armature to minimum heating source control position.

11. A metal welding control circuit as in claim 9 wherein said control circuit has a damping signal differential transformer having the primary coil thereof connected to said power source when said switching means is in automatic position and having the secondary coil thereof connected to said amplifier for producing an input signal in a phase which will provide for damping of said metal temperature dependent signal and having the transformer core thereof movable dependent upon torque motor armature movement whereby the cyclic positioning of said torque motor armature is damped.

12. The metal welding control circuit as in claim 9 wherein said circuit has a metal speed variable relay switch therein for controlling power to said metal temperature sensing and signalling means whereby said sensing and signalling means sends signals to said amplifier only upon said welding metal maintaining a calculated welding machine speed.

13. A metal welding control circuit for electrically controlling the welding energy input per unit length of metal from a heating source comprising, a series summation signal amplifier, a power source for said amplifier, a torque motor having coils and an armature controlled by an output signal from said amplifier, a heating source control variable by said torque motor for controlling said heating source, a switching means having a manual position and an automatic position, at least two manually variable metal temperature reference signal potentiometers connected to said power source by said switching means in manual position and in automatic position, the manually variable metal temperature reference signal from the first of said reference signal potentiometers connected to said amplifier by said switching means in manual position, the second of said reference signal potentiometers connected to said amplifier by said switching means when in automatic position, a torque motor position transducer for generating an input signal to said signal amplifier in direct proportion to said torque motor position and powered by said power source when said switching means is in manual position, a heating source control variable by said torque motor for controlling said heating source, a welding metal temperature variable grounded output Wheatstone bridge powered by said power source through a power supply transformer adjustable by a manually adjusted potentiometer, said Wheatstone bridge connected to said signal amplifier by said switching means in automatic position through a transistor operated emitter follower, the temperature variable resistance of said Wheatstone bridge variable with respect to the temperature of the welding metal heated by said heating source, the metal temperature reference signal from the first of said manually adjustable potentiometers compared in said signal amplifier when said switching means is in manual position to the torque motor position signal from said torque motor position signal transducer, the deviation signal between said torque motor position signal and said manually variable metal temperature reference signal driving said torque motor to a position wherein a torque motor position signal of less deviation from said manually variable metal temperature reference signal is generated, and the metal temperature reference signal from the second of said manually adjustable potentiometers compared to said Wheatstone bridge signal when said switching means is in automatic position in said amplifier and producing an amplified deviation output signal for driving said torque motor to a position wherein said heating source control energy input per unit length of metal is varied whereby said Wheatstone bridge signal is controlled to a state of less deviation from said manually adjusted reference signal.

14. A metal welding control circuit for electrically controlling the welding energy input per unit length of metal as in claim 13 wherein a manually adjustable bias signal transformer is connected by the primary coil to said power source directly whereby a quiescent current is produced, and wherein said transformer secondary coil is connected through a manually variable potentiometer to said amplifier wherein it is combined with said metal temperature reference signal.

15. A metal sheet tubular forming and welding horn having therein a glass rod and a temperature sensitive device well, said glass rod having an end thereof positioned in close proximity to the welding site of the metal sheet and the opposite end thereof connected to said well, at least one temperature sensitive resistance variable device positioned in said well for receiving light and heat radiation from said welding metal site, said glass rod transmitting heat signal to said temperature sensitive device, and said resistance connected to a welding energy source control circuit.

16. A metal sheet tubular forming and welding horn as in claim 15 wherein said well is positioned from said metal welding site a distance sufficient to minimize resistance variations due to the metal welding temperature.

17. A control device for a welding machine of the type forming a continuous weld seam between two metal edge portions, and wherein said machine includes means for continuously feeding the metal edge portions and means for heating the metal edge portions; said control device comprising a detector for detecting the temperature of the seam at the seam forming site, said detector having an energy input and output, the energy output being variable by the detected weld seam temperature, and control means controlled by the energy output of said detector for controlling the edge portion movement to heat input ratio with respect to variations of weld temperatures detected by said detector.

18. A control device as in claim 17 wherein said control means varies the speed of the feeding means of said welding machine.

19. A control device as in claim 17 wherein said control means varies the heating means of said welding machine.

20. A control device for a welding machine of the type forming a continuous weld seam between two metal edge portions, and wherein said machine includes means for continuously feeding the metal edge portions, means for heating the metal edge portions and means for forging together the metal edge portions; control means operable to adjust the rate at which energy is supplied to said means for heating, means for sensing the visible and infrared heat radiation of said metal edge portions and emitting a signal proportionate to said heat radiation of said metal edge portions, and means responsive to said sensing and signal emitting means for operating said control means to maintain the heat of said metal edge portions within preselected limits.

21. A control device for a welding machine of the type forming a continuous weld seam between two metal edge portions of a shaped skelp to form tubing therefrom, and wherein said machine includes means for continuously feeding the metal edge portions, means for heating the metal edge portions, and means for forging together the metal edge portions; control means for adjusting the rate at which energy is supplied to said means for heating, means situated within said shaped skelp for sensing the visible and infrared heat radiation of said metal edge portions and emitting a signal proportionate to said heat radiation of said metal edge portions, and means responsive to said sensing and signal emitting means for operating said control means to maintain the heat of said metal edge portions within preselected limits.

References Cited
UNITED STATES PATENTS

| | | | |
|---|---|---|---|
| 2,709,367 | 5/1955 | Bohnet | 73—355 |
| 2,774,019 | 12/1956 | Hornfeck | 318—20.715 |
| 3,240,913 | 3/1966 | Schubert | 219—60 |

RICHARD M. WOOD, *Primary Examiner.*

B. A. STEIN, *Assistant Examiner.*